US008396170B2

(12) United States Patent
Luo et al.

(10) Patent No.: US 8,396,170 B2
(45) Date of Patent: Mar. 12, 2013

(54) UTILIZATION OF A KNOWN PORTION OF A PAYLOAD TO DECODE A PAYLOAD HAVING A KNOWN AND AN UNKNOWN PORTION

(75) Inventors: Tao Luo, San Diego, CA (US); Xiaoxia Zhang, San Diego, CA (US); Kibeom Seong, West New York, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 12/834,772

(22) Filed: Jul. 12, 2010

(65) Prior Publication Data

US 2011/0164707 A1 Jul. 7, 2011

Related U.S. Application Data

(60) Provisional application No. 61/230,090, filed on Jul. 30, 2009.

(51) Int. Cl.
*H04L 27/06* (2006.01)
(52) U.S. Cl. .......................................... 375/340; 375/316
(58) Field of Classification Search .................. 375/145, 375/240.01, 260, 340, 341; 714/751; 370/329
See application file for complete search history.

(56) References Cited

U.S. PATENT DOCUMENTS

| | | | | |
|---|---|---|---|---|
| 6,697,984 B1 * | 2/2004 | Sim et al. | ...................... | 714/751 |
| 7,042,963 B1 * | 5/2006 | Raith et al. | ..................... | 375/341 |
| 7,483,473 B2 * | 1/2009 | Hoffmann et al. | ............ | 375/145 |
| 2009/0010348 A1 * | 1/2009 | Li et al. | ......................... | 375/260 |
| 2009/0296644 A1 * | 12/2009 | Cheon et al. | .................. | 370/329 |
| 2010/0226425 A1 * | 9/2010 | Keating et al. | ........... | 375/240.01 |

FOREIGN PATENT DOCUMENTS

| | | |
|---|---|---|
| WO | WO9608904 A1 | 3/1996 |
| WO | WO 00/35137 A3 * | 6/2000 |
| WO | WO0035137 A8 | 3/2001 |
| WO | WO2007141468 A1 | 12/2007 |

OTHER PUBLICATIONS

International Search Report and Written Opinion—PCT/US2010/043834—ISA/EPO—Apr. 14, 2011.
3GPP TS 25.211 V5.8.0, 3rd Generation Partnership Project; Technical Specification Group Radio Access Network;Physical channels and mapping of transport channels onto physical channels, Dec. 2005 (Release 5), pp. 1-39.
3GPP TS 25.213 V5.6.0 (Jun. 2005) 3rd Generation Partnership Project; Technical Specification Group Radio Access Network; Spreading and Modulation (FDD) (Release 5), pp. 1-25.

* cited by examiner

*Primary Examiner* — Daniel Washburn
*Assistant Examiner* — Fitwi Hailegiorgis
(74) *Attorney, Agent, or Firm* — Nerrie M. Zohn

(57) ABSTRACT

A method, an apparatus, and a computer program product for wireless communication are provided in which a payload is received, the payload having a known portion and an unknown portion. The payload is decoded through correlation, where correlation includes the generation of a plurality of payload hypothesis based on possible combinations of the unknown portion and using the known portion and the generation of a metric value based on each of the plurality of payload hypothesis. The received payload is selected through a determination of the payload hypothesis having a largest generated metric value.

36 Claims, 15 Drawing Sheets

_US 8,396,170 B2_

UTILIZATION OF A KNOWN PORTION OF A PAYLOAD TO DECODE A PAYLOAD HAVING A KNOWN AND AN UNKNOWN PORTION

CROSS-REFERENCE TO RELATED APPLICATION(S)

This application claims the benefit of U.S. Provisional Application Ser. No. 61/230,090, entitled "UTILIZATION OF A KNOWN PAYLOAD TO DECODE A BROADCAST CHANNEL" and filed on Jul. 30, 2009, the contents of which are hereby incorporated by reference herein in their entirety.

BACKGROUND

1. Field

The present disclosure relates generally to communication systems, and more particularly, to the utilization of a known portion of payload to assist in decoding a payload having a known and an unknown portion.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, an apparatus, and a computer program product for wireless communication are provided in which a plurality of candidate payloads are generated for a received payload, each candidate payload including a first payload portion and a second payload portion, wherein the first payload portion includes assumed known values and the second payload portion includes unknown values. The plurality of candidate payloads are based on combinations of the first payload portion and possible second payload portions. The received payload is decoded based on a correlation of the received payload with the candidate payloads.

DETAILED DESCRIPTION

Figure 1:
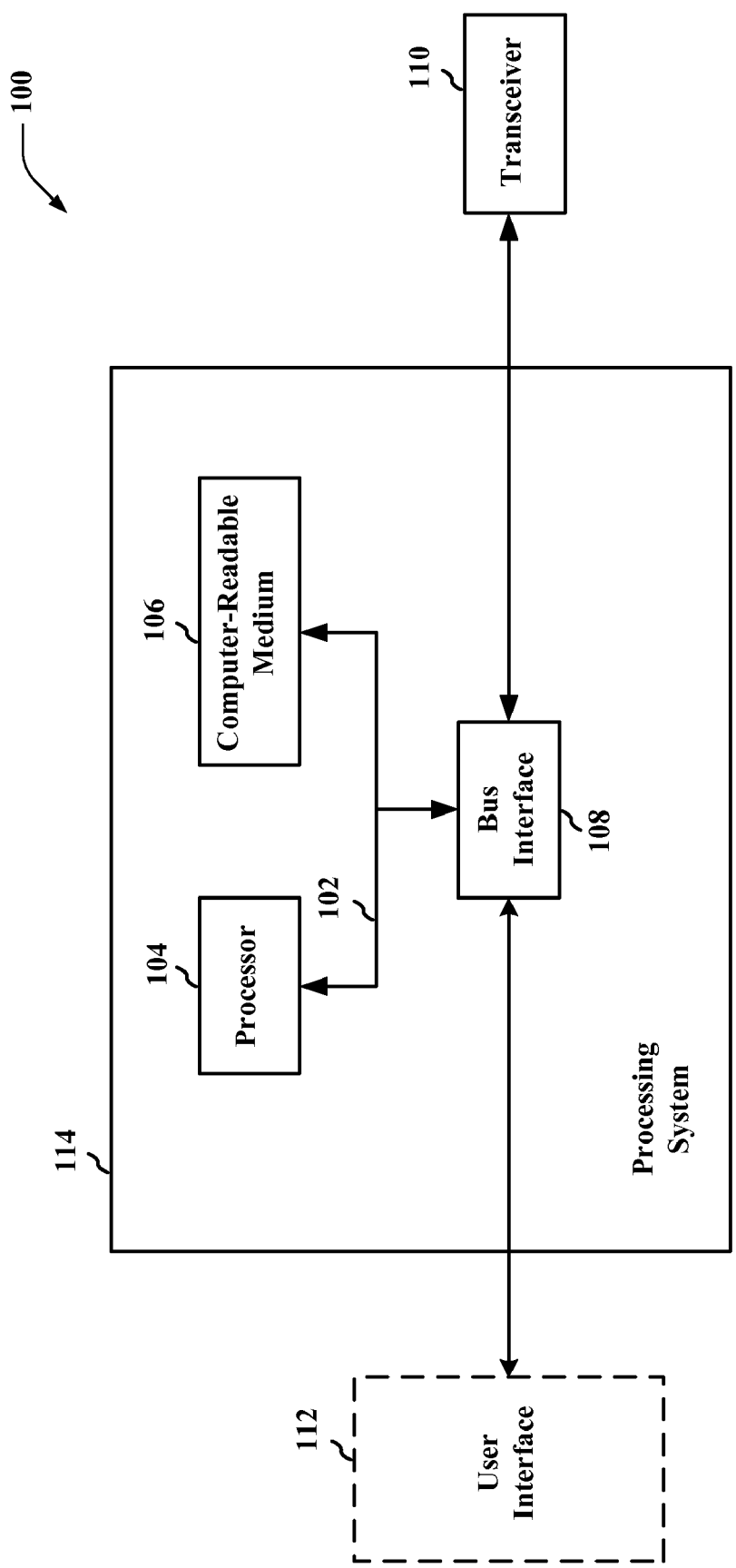
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
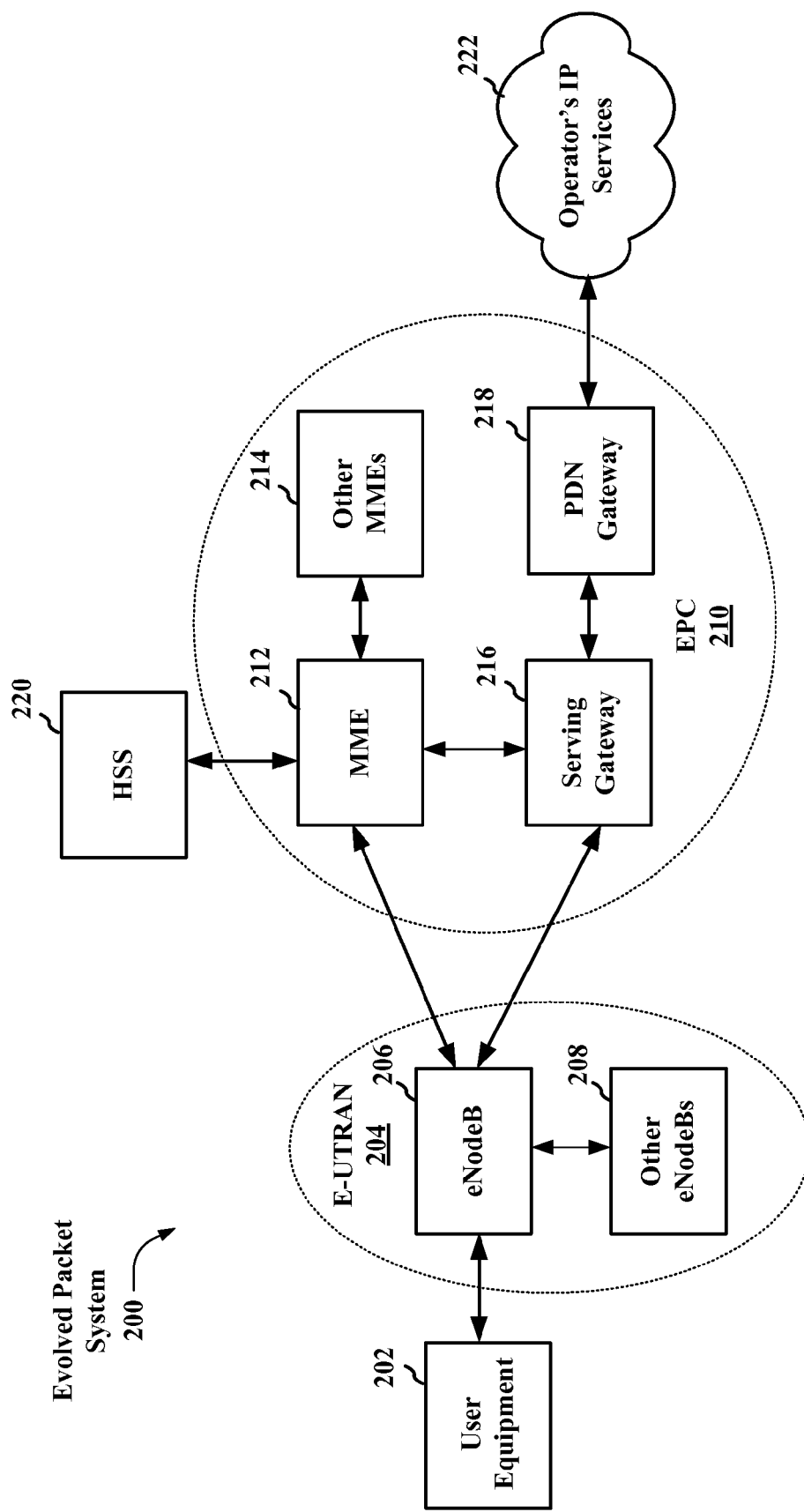
FIG. 2 is a diagram illustrating an example of a network architecture.

FIG. 2 is a diagram illustrating an LTE network architecture 200 employing various apparatuses 100. The LTE network architecture 200 may be referred to as an Evolved Packet System (EPS) 200. The EPS 200 consists of one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 212. The Operator's IP Services 222 include the Internet, the Intranet, an IP Multimedia Subsystem (IMS), and a PS Streaming Service (PSS).

Figure 3:
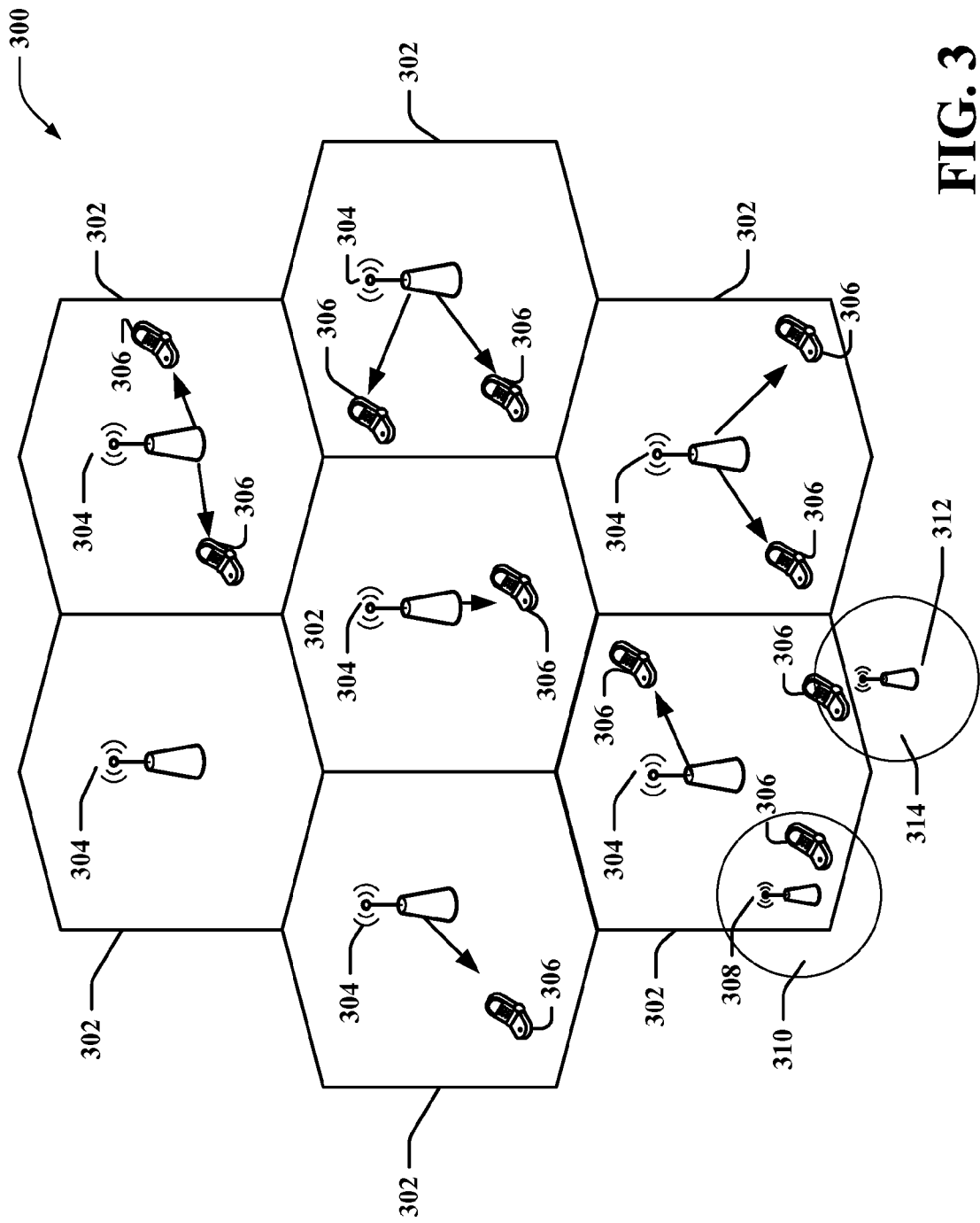
FIG. 3 is a diagram illustrating an example of an access network.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216.

The modulation and multiple access scheme employed by the access network 300 may vary depending on the particular telecommunications standard being deployed. In LTE applications, OFDM is used on the DL and SC-FDMA is used on the UL to support both frequency division duplexing (FDD)

and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream and then transmitting each spatially precoded stream through a different transmit antenna on the downlink. The spatially precoded data streams arrive at the UE(s) 306 with different spatial signatures, which enables each of the UE(s) 306 to recover the one or more the data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 402, 404, include a DL reference signal (DL-RS). The DL-RS include Cell-specific RS (CRS) (also sometimes called common RS) 402 and UE-specific RS (UE-RS) 404. UE-RS 404 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
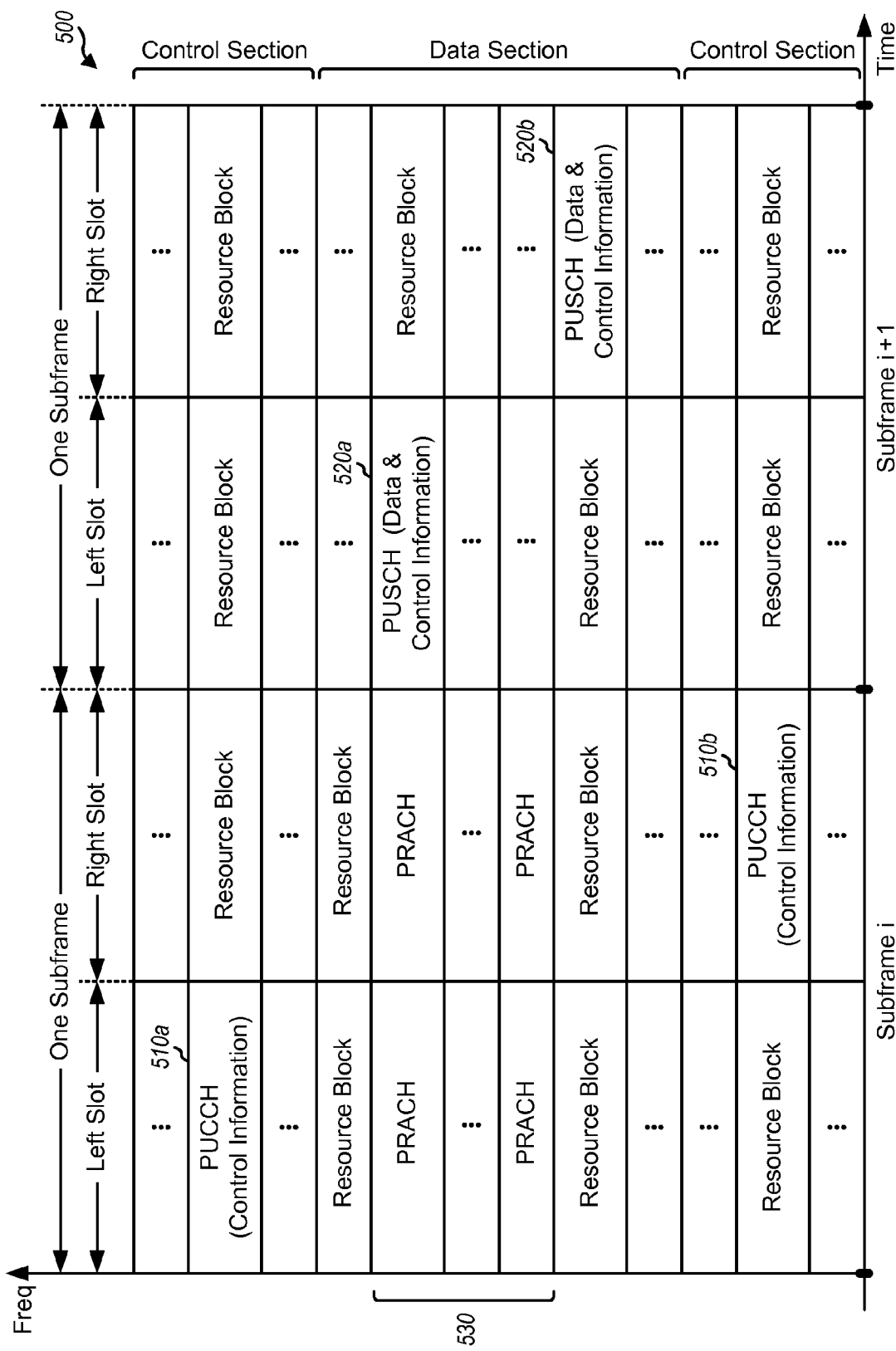
FIG. 5 shows an exemplary format for the UL in LTE.

An example of an UL frame structure 500 will now be presented with reference to FIG. 5. FIG. 5 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510a, 510b in the control section to transmit control information to an eNB. The UE may also be assigned resource blocks 520a, 520b in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An UL transmission may span both slots of a subframe and may hop across frequency as shown in FIG. 5.

As shown in FIG. 5, a set of resource blocks 530 may be used to perform initial system access and achieve UL synchronization in a physical random access channel (PRACH). The PRACH carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for PRACH. The PRACH attempt is carried in a single subframe (1 ms) and a UE can make only a single PRACH attempt per frame (10 ms).

The PUCCH, PUSCH, and PRACH in LTE are described in 3GPP TS 36.211, entitled "Evolved Universal Terrestrial Radio Access (E-UTRA); Physical Channels and Modulation," which is publicly available.

Figure 6:
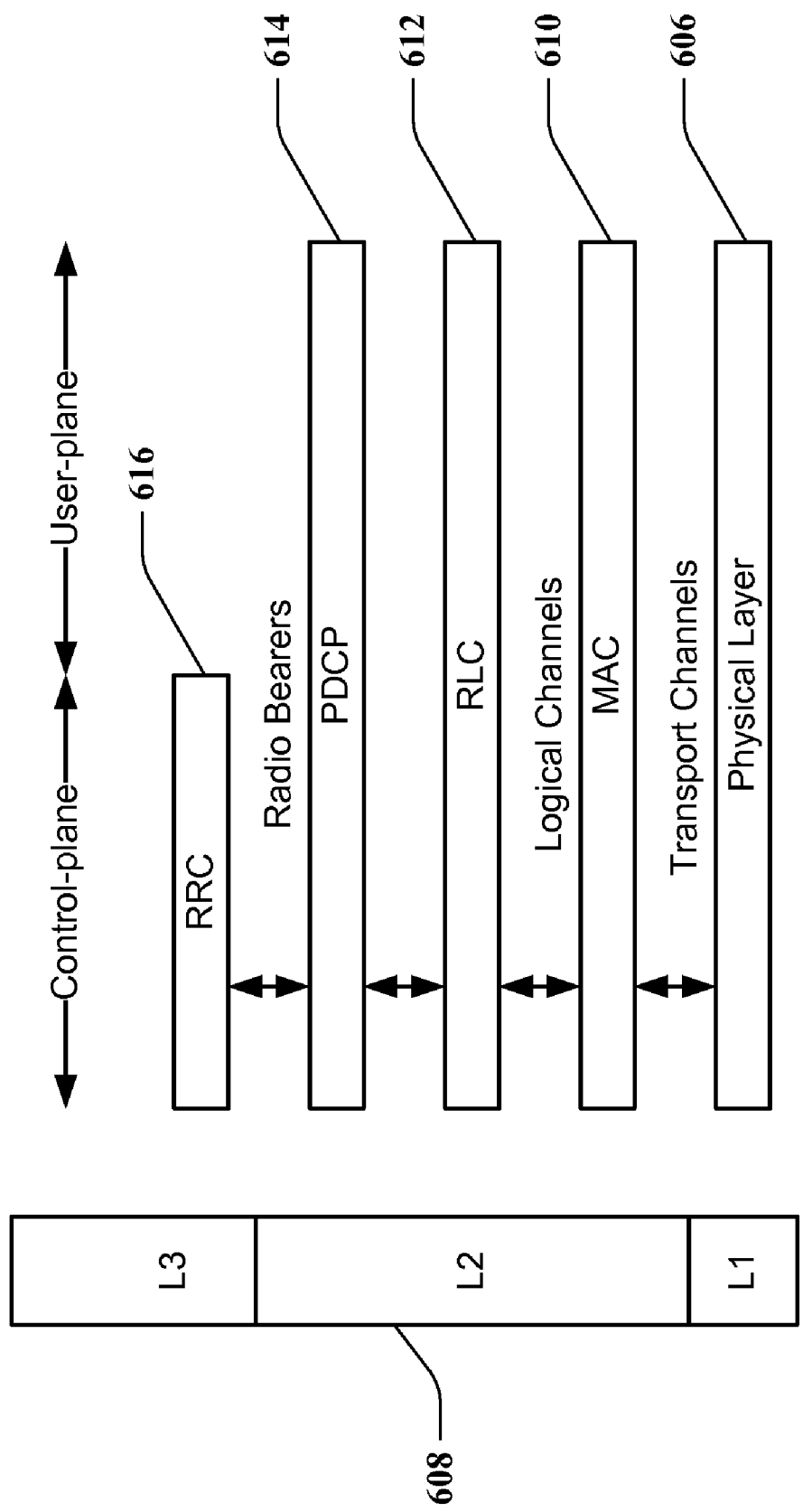
FIG. 6 is a diagram illustrating an example of a radio protocol architecture for the user and control plane.

The radio protocol architecture may take on various forms depending on the particular application. An example for an LTE system will now be presented with reference to FIG. 6. FIG. 6 is a conceptual diagram illustrating an example of the radio protocol architecture for the user and control planes.

Turning to FIG. 6, the radio protocol architecture for the UE and the eNB is shown with three layers: Layer 1, Layer 2, and Layer 3. Layer 1 is the lowest lower and implements various physical layer signal processing functions. Layer 1 will be referred to herein as the physical layer 606. Layer 2 (L2 layer) 608 is above the physical layer 606 and is responsible for the link between the UE and eNB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNB on the network side. Although not shown, the UE may have several upper layers above the L2 layer 608 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNBs. The RLC sublayer 612 provides segmentation and reassembly of upper layer data packets, retransmission of lost data packets, and reordering of data packets to compensate for out-of-order reception due to hybrid automatic repeat request (HARM). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control plane, the radio protocol architecture for the UE and eNB is substantially the same for the physical layer 606 and the L2 layer 608 with the exception that there is no header compression function for the control plane. The control plane also includes a radio resource control (RRC) sublayer 616 in Layer 3. The RRC sublayer 616 is responsible for obtaining radio resources (i.e., radio bearers) and for configuring the lower layers using RRC signaling between the eNB and the UE.

Figure 7:
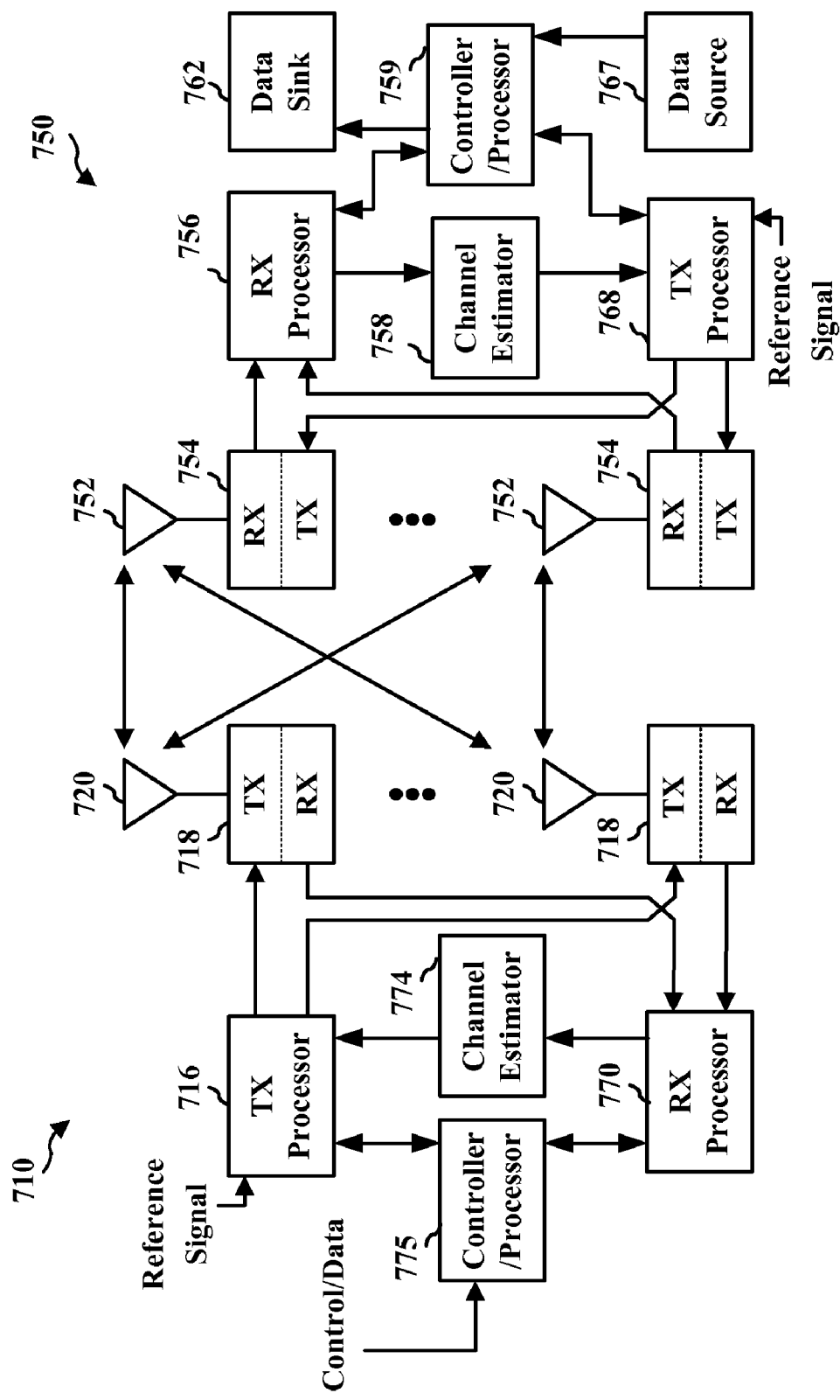
FIG. 7 is a diagram illustrating an example of an evolved Node B and user equipment in an access network.

FIG. 7 is a block diagram of an eNB 710 in communication with a UE 750 in an access network. In the DL, upper layer packets from the core network are provided to a controller/processor 775. The controller/processor 775 implements the functionality of the L2 layer described earlier in connection with FIG. 6. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 710. These soft decisions may be based on channel estimates computed by the channel estimator 758. The soft decisions are then decoded and deinterleaved to recover the data and control signals that were originally transmitted by the eNB 710 on the physical channel. The data and control signals are then provided to the controller/processor 759.

The controller/processor 759 implements the L2 layer described earlier in connection with FIG. 5. In the UL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the eNB 710, the controller/processor 759 implements the L2 layer for the user plane and the control plane by providing header compression, ciphering, packet segmentation and reordering, and multiplexing between logical and transport channels based on radio resource allocations by the eNB 710. The controller/processor 759 is also responsible for HARQ operations, retransmission of lost packets, and signaling to the eNB 710.

Channel estimates derived by a channel estimator 758 from a reference signal or feedback transmitted by the eNB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNB 710 in a manner similar to that described in connection with the receiver function at the UE 750. Each receiver 718RX receives a signal through its respective antenna 720. Each receiver 718RX recovers information modulated onto an RF carrier and provides the information to a RX processor 770. The RX processor 770 implements the L1 layer.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the UE 750. Upper layer packets from the controller/processor 775 may be provided to the core network. The controller/processor 759 is also responsible for error detection using an acknowledgement (ACK) and/or negative acknowledgement (NACK) protocol to support HARQ operations.

The processing system 114 described in relation to FIG. 1 includes the UE 750. In particular, the processing system 114 includes the TX processor 768, the RX processor 756, and the controller/processor 759.

Transmission of digital data is inherently prone to interference, which may introduce errors into the transmitted data. Error detection mechanisms increase reliability in determining whether possible errors have been introduced into the transmitted data. For example, it is common to transmit data in packets and to add to each packet, a CRC field, for example, of a length of sixteen bits, which carries a checksum of the data of the packet. When a receiver receives the data, the receiver calculates the same checksum on the received data and verifies whether the result of the calculation is identical to the checksum in the CRC field.

When the transmitted data is not used in real time, it may be possible to request retransmission of erroneous data when errors are detected. However, when the transmission is performed in real time, such as, e.g., in voice calls over traditional telephones or cellular phones, video conference calls, etc., it is not possible to request retransmission.

Convolutional codes have been introduced to allow receivers of digital data to correctly determine the transmitted data even when errors may have occurred during transmission. The convolutional codes introduce redundancy into the transmitted data and pack the transmitted data into packets in which the value of each bit is dependent on earlier bits in the sequence. Thus, when errors occur, the receiver can still deduce the original data by tracing back possible sequences in the received data.

To further improve the performance of a transmission channel, some coding schemes include interleavers, which mix up the order of the bits in the packet during coding. Thus, when interference destroys some adjacent bits during transmission, the effect of the interference is spread out over the entire original packet and can more readily be overcome by the decoding process. Other improvements may include multiple-component codes that encode the packet more than once, in parallel or in series. For example, it is known in the art to employ an error correction method that uses at least two convolutional coders in parallel. Such parallel encoding is commonly referred to as turbo coding.

Turbo codes are serial or parallel concatenations of two or more constituent coders separated by one or more code interleavers. Turbo codes are often decoded with a relatively efficient iterative algorithm to achieve low error rates at signal-to-noise ratios (SNRs) approaching the Shannon limit. The interleavers and deinterleavers are inserted between the component code encoders and decoders, respectively.

As discussed above, the interleaver in a turbo coder spreads the codewords output from an encoder so that individual bits of a given codeword are separated from each other and transmitted at different times. Consequently, individual bits of a given code experience independent fading such that the bits affected by an error burst belong to different codewords. At the receiver, the received samples are deinterleaved prior to decoding. Hence, the effect of the error burst is spread over the message so that it is possible to recover the data with the original error-correcting code. The performance of turbo codes depends on the length and structure of the code interleavers used. Various types of interleavers are known in the art including, e.g., diagonal interleavers, convolutional interleavers, block interleavers, interblock interleavers, and pseudo-random interleavers. Good turbo code performance can be achieved by using interleavers having pseudo-random structures.

Turbo coding represents an important advancement in the area of forward error correction (FEC). There are many variants of turbo coding, but most types of turbo coding use multiple encoding steps separated by interleaving steps combined with the use of iterative decoding. This combination provides previously unattainable performance with respect to noise tolerance in a communications system. Namely, turbo coding allows reliable communications at lower energy-per-bit per noise power spectral density than was previously possible using the existing forward error correction techniques.

For multiple-component codes such as turbo codes, optimal decoding is often a very complex task, and may require large periods of time not usually available for on-line decoding. The task may, in fact, be almost impossible, requiring theoretical completion times on the order of the age of the universe. Iterative decoding techniques have been developed to overcome this problem. Rather than determining immediately whether received bits are zero or one, the receiver assigns each bit a value on a multilevel scale representative of the probability that the bit is one. A common scale, referred to as log-likelihood ratio (LLR) probabilities, represents each bit by an integer in some range, e.g., $\{-32, 31\}$. A value of 31 signifies that the transmitted bit was a zero with very high probability, and a value of $-32$ signifies that the transmitted bit was a one, with very high probability. A value of zero indicates that the logical bit value is indeterminate.

Data represented on the multilevel scale is referred to as "soft data," and iterative decoding is usually soft-in/soft-out, i.e., the decoding process receives a sequence of inputs corresponding to probabilities for the bit values and provides as output corrected probabilities, taking into account constraints of the code. Generally, a decoder that performs iterative decoding uses soft data from former iterations to decode the soft data read by the receiver. During iterative decoding of multiple-component codes, the decoder uses results from decoding of one code to improve the decoding of the second code. When parallel encoders are used, as in turbo coding, two corresponding decoders may conveniently be used in parallel for this purpose. Such iterative decoding is carried out for a plurality of iterations until it is believed that the soft data closely represents the transmitted data. Those bits that have a probability indicating that they are closer to one (for example, values between 0 and 31 on the scale described above) are assigned binary zero, and the remaining values are assigned binary one.

An LLR is thus a probability metric used by a turbo decoder to determine whether a given symbol was transmitted given a particular received symbol. To compute the LLR, an accurate estimate of the SNR and the channel coefficient (a complex scale factor applied to the transmitted signal by the channel) may be required. Accurate LLR values can be particularly important in turbo decoding applications in which the LLR inputs are typically subjected to nonlinear operations that can amplify inaccuracies in the LLR values and result in unacceptable decoder performance.

In some aspects the teachings herein may be employed in a Heterogeneous network (HetNet) that includes macro scale coverage (e.g., a large area cellular network, typically referred to as a macro cell network) and smaller scale coverage (e.g., a residence-based or building-based network environment). FIG. 3 illustrates an example of a HetNet. As the UE moves through such a network, the access terminal may be served in certain locations by access nodes that provide macro coverage while the access terminal may be served at other locations by access nodes that provide smaller scale coverage.

HetNets may face unique interference challenges because they include different classes of eNBs, as illustrated in connection with FIG. 3. Such interference challenges may include large interference between neighboring or overlapping macrocells, femtocells, and picocells. A Physical Broadcast Channel (PBCH) conveys time-critical information that is essential for decoding control and data channels. Therefore, in HetNet environments, it is crucial to make PBCH decoding robust to strong interference.

In addition, it is beneficial to provide additional ways of decoding a PBCH rather than just directly decoding the entire received PBCH signal. As discussed in more detail below, this may include decoding the PBCH signal using a known portion of the PBCH payload, which has been acquired separate from the current PBCH signal. For example, the PBCH signal may be decoded by correlation using the known portion of the PBCH payload. Alternately, only the unknown portion of the PBCH signal may be decoded directly and the knowledge of the known portion of the PBCH signal may be used. These manners of decoding a PBCH payload may increase efficiency, because the entire PBCH codeword will not need to be directly decoded.

A PBCH carries the primary Broadcast Transport Channel. It includes overall DL transmission bandwidth, a System Frame Number (SFN), a Physical Hybrid Automatic Repeat Request Indicator Channel (PHICH) Configuration, and reserved bits. The PBCH is transmitted in subframe 0 in every frame. Four OFDM symbols are included in the second slot of the corresponding subframe for Frequency Division Duplex (FDD) frame structure as defined in 36.211. It is noted that aspects may be directed to a Time Division Duplex (TDD) system, also. The frequency middle is 1.08 MHz, or 6 Resource Blocks (RBs) at 180 KHz, as illustrated in FIG. 8.

Figure 8:
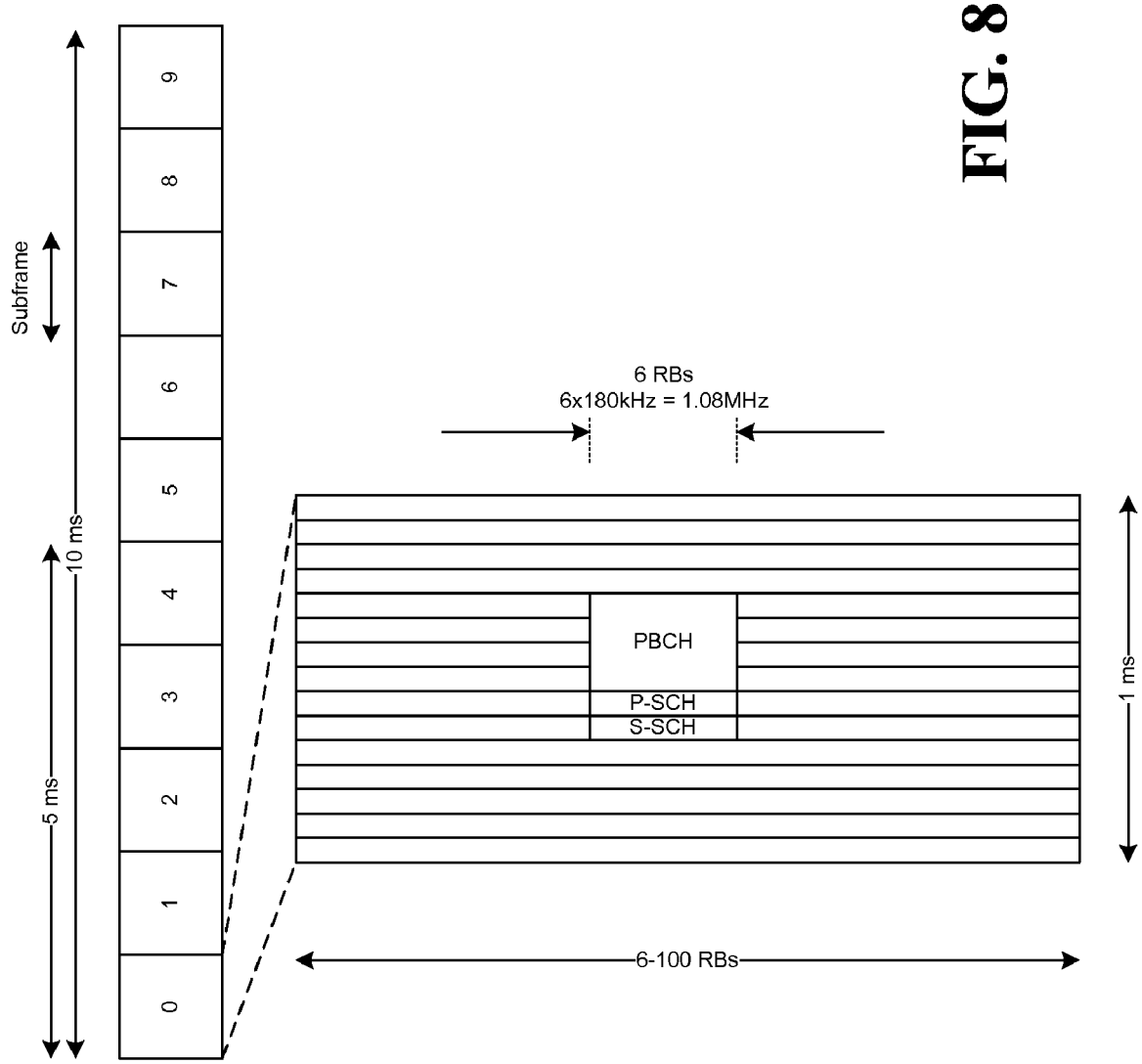
FIG. 8 is a diagram of an example of a frame structure for use in an access network.

The PBCH is transmitted every 10 ms in subframe 0, as illustrated in FIG. 8. The same information is transmitted four times in order to enable soft combining and to enhance the demodulation performance. Thus, the PBCH is transmitted in four bursts at a very low data rate, each 10 ms burst being self-decodable. A redundant version of the encoded data uniquely determines the 40 ms PBCH Transmission Time Interval (TTI) boundary since encoded data is unique for each burst within 40 ms.

The PBCH contains the Master Information Block (MIB) which contains enough information to enable a UE to read the System Information Blocks (SIBs) in the DL shared channel (DL-SCH). The amount of data in the PBCH contained in the MIB is limited to the DL system bandwidth, the PHICH configuration, and the most significant eight bits of the System Frame Number. Keeping the amount of data small reduces the data rate, which maintains robust coverage to the edge of the cell. Conventionally, a UE will blindly try to decode the PBCH directly for all antenna configurations to learn which scheme is being used.

The PHICH portion of the PBCH payload changes to indicate a change in resources used for PHICH. The PHICH duration and the number of PHICH groups are transmitted on the PBCH to help a UE infer into which remaining Resource Elements in the control region the Physical DL Control Channel PDCCH is mapped.

Figure 9:
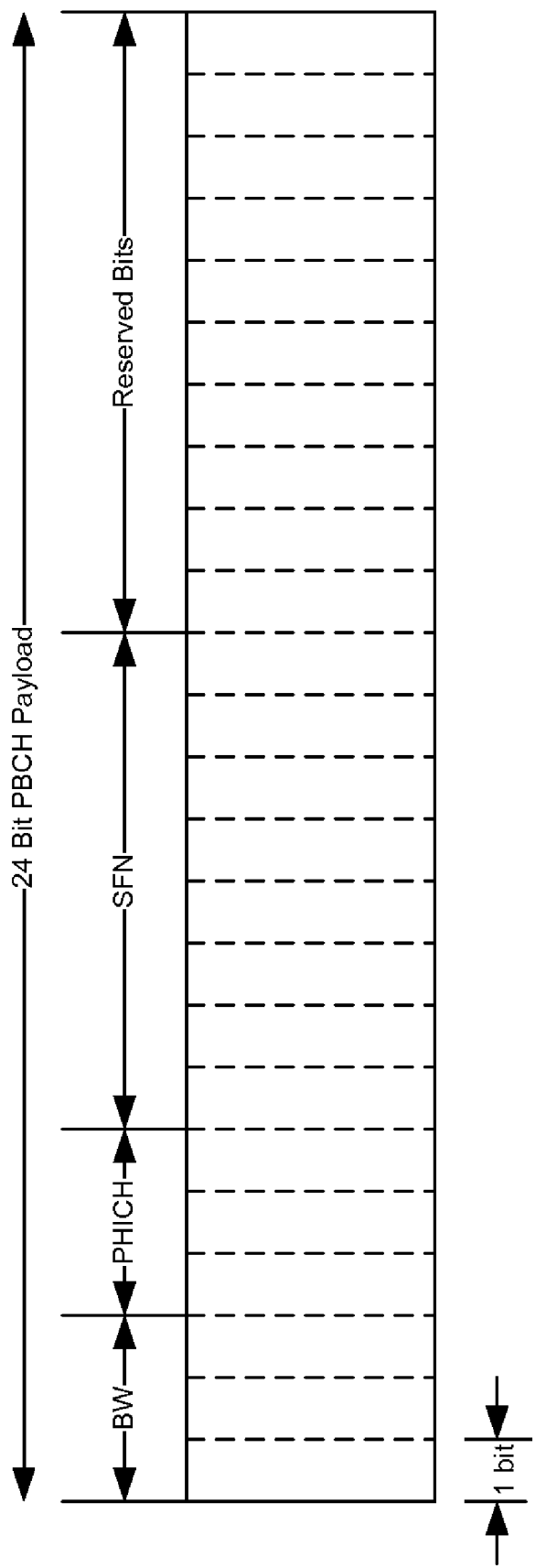
FIG. 9 is a diagram of an example Physical Broadcast Channel payload for use in an access network.

The PBCH payload comprises 24 bits. FIG. 9 illustrates that 3 bits include system bandwidth (BW) information, 3 bits include the PHICH configuration, 8 bits include 8 Most Significant Bits (MSBs) of a 10 bit SFN, and 10 bits are reserved. FIG. 9 merely illustrates the proportion of bits that each set of information comprises, the order of information in the payload may vary from FIG. 9.

Figure 10:
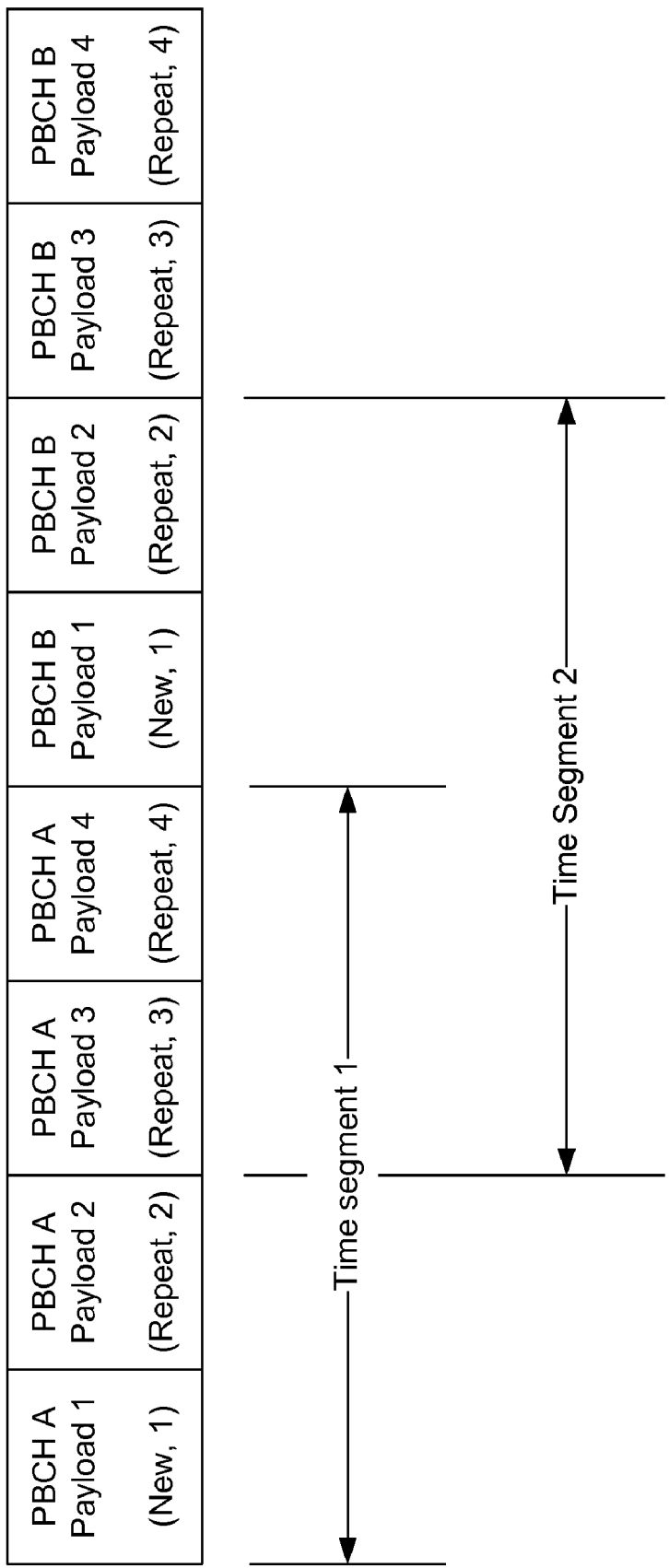
FIG. 10 is a diagram of an example of repetitions of a Physical Broadcast Channel payload.

The same PBCH payload repeats four times within a 40 ms period. At the end of the four repetitions, the SFN field increases by 1. Therefore, once a UE knows the time at which the SFN increments, the UE is able to calculate the SFN for future PBCH payloads. At most, this would require the UE to receive four payloads. However, if the SFN incremented on the second payload received by the UE, the UE would have all of the information necessary to calculate the future SFN. For example, if the UE receives all four repetitions of a PBCH, such as during time segment 1 in FIG. 10, the UE will know that the next PBCH (PBCH B) will have a SFN field incremented by 1. Alternately, the UE might receive different PBCH payloads, e.g., PBCH A and PBCH B, within the four received PBCH payloads, such as occurs during time segment 2. After receiving Payload 1 of PBCH B, the UE will be able to determine the time at which the SFN will again increase.

Therefore, once a UE has received an SFN and has information about the time point at which the SFN increments, the SFN for future PBCH can be determined based on the SFN information in the received PBCH payloads and a knowledge of the point at which the SFN will change.

Figure 11:
FIG. 11 is a diagram illustrating an exemplary received payload having a known portion and an unknown portion.

The bandwidth information for the PBCH will remain essentially the same for each cell, because the bandwidth is rarely changed. Furthermore, the same information is repeated in the reserved bits for each cell. Therefore, after decoding the PBCH payload, the only information that would be unknown for future PBCH payloads is the 3-bit PHICH configuration. FIG. 11 illustrates an exemplary received payload having a known portion 1101 and an unknown portion 1102. The known portion 1101 includes the bandwidth, the SFN, and the reserved bits, all of which are assumed to be identical to corresponding fields in previously decoded PBCH payloads.

Figure 12:
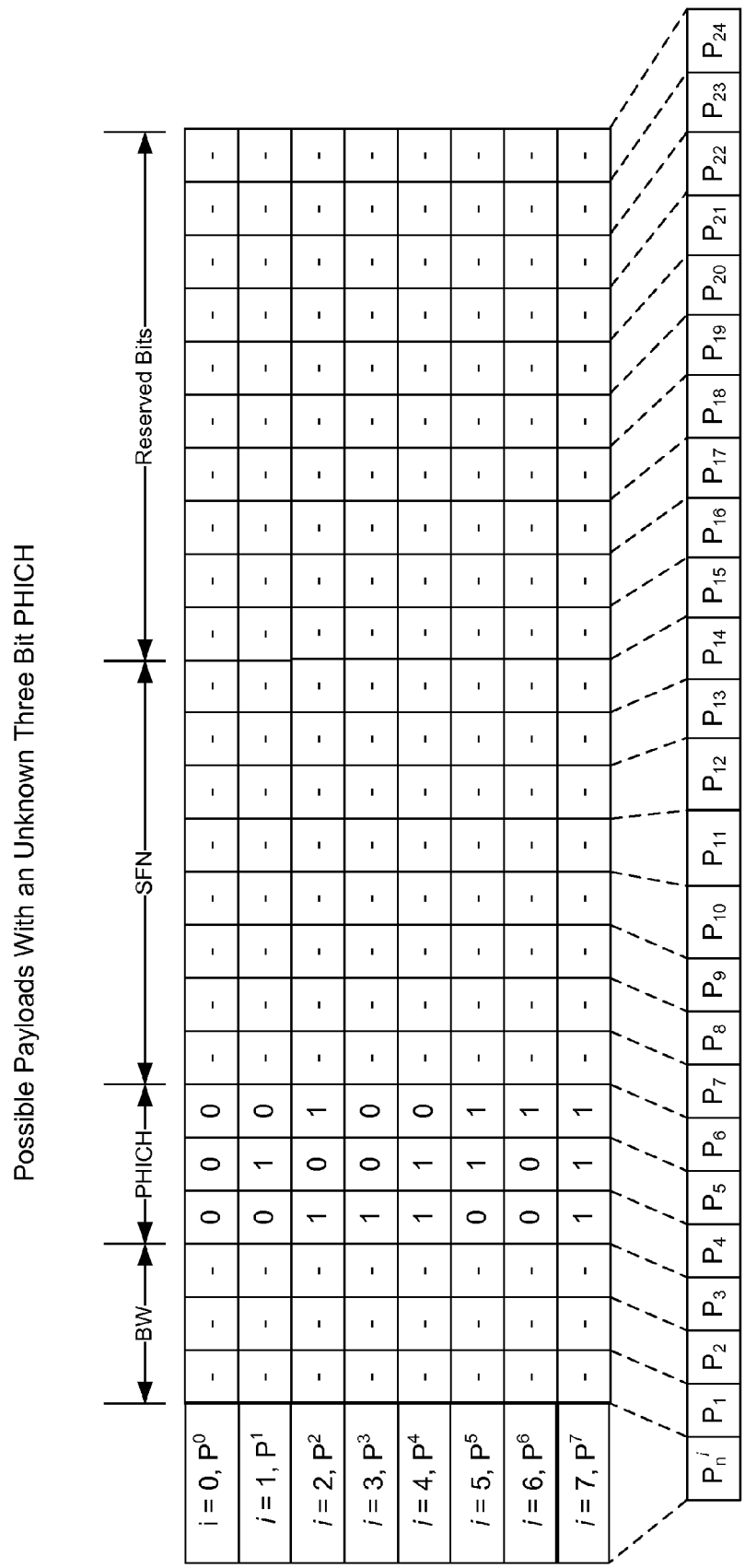
FIG. 12 is a table illustrating aspects of an example reliability metric.

For an unknown portion comprising a three bit PHICH configuration, there are eight possible payloads. With any known field values, the uncertainty in the payload decreases, and it becomes possible to perform hypothesis testing on each of the possible payload combinations. FIG. 12 illustrates the eight possible payloads. In FIG. 12, the 3 bit bandwidth information is known, the calculated eight bit SFN can be calculated, and the reserved bits are known. The known information is represented by "–" in FIG. 12. As the unknown PHICH portion includes three bits, the possibilities are 000, 010, 101, 100, 110, 011, 001, and 111. The possible payloads, P, generated by combining the known portions with each of the possibilities for the unknown portion are shown as $P_n^i$, with i=0 to 7, and n=1 to 24. The variable n represents the individual bits in the payload.

In order to perform decoding by correlation, a UE needs to know where the PHICH is located within the PBCH. This information can also be determined from a previous PBCH payload.

For each candidate payload $P^i$, a 16-bit CRC is attached to the potential 24-bit candidate PBCH payload. Then, a Tail-Biting Convolutional Coding (TBCC) is performed to generate a 120 bit candidate codeword $c^i$ for each candidate payload $P^i$, for i=0 to 7. The codewords $c^{(0)}$, $c^{(1)}$, ..., $c^{(7)}$ will then be similar to the codewords generated by the eNB when processing and transmitting a PBCH payload to a UE. This encoding may be performed as described in 3GPP TS 36.212.

A 24 bit PBCH payload is encoded before being transmitted from an eNB. This encoding may include the addition of a 16 bit CRC and TBCC as described in 3GPP TS 36.212. Therefore, the encoding described supra for generating the candidate codewords from the candidate payloads should be the same as the encoding performed on the received PBCH payload. The CRC and convolutional codes provide reliability in determining whether transmitted data has been received correctly. As an additional error detection mechanism, the bits of the received, encoded PBCH payload may be represented using an LLR probability, as discussed supra.

The codewords corresponding to candidate payloads can be evaluated through correlation with a received codeword in order to determine the received payload. A reliability metric may then be calculated for each of the candidate codewords by correlating the generated, candidate codewords with a received codeword corresponding to a PBCH payload. For example, the following metric may be applied:

$$Metric_i = \sum_{n=1}^{N} c_n^{(i)} LLR_n$$

In this metric, i indicates the hypothesis index (e.g., an index of a candidate payload), c indicates the codeword bit of a candidate payload (e.g., $c_n^{(i)}$ indicates the nth codeword bit of candidate payload i), $LLR_n$ indicates the $n^{th}$ bit of a log likelihood ratio computed from the received PBCH signal, and N indicates the codeword length.

Figure 4:
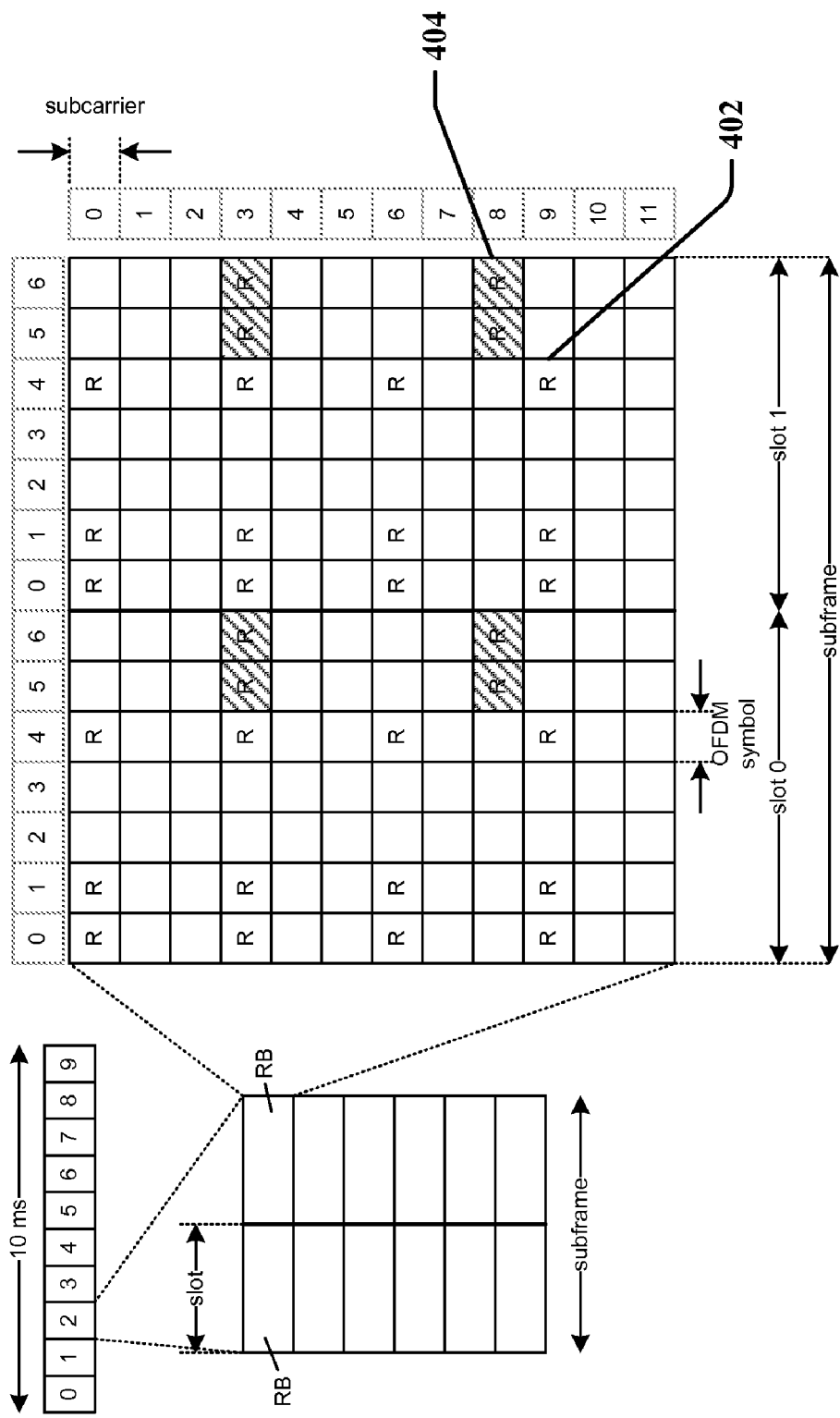
FIG. 4 is a diagram illustrating an example of a frame structure for use in an access network.

As shown in FIG. 4, 48 resource elements are available for each of 6 Resource Blocks. This would provide 288 resource elements, as 48*6=288. However, as illustrated in FIG. 4, a number of resource elements may be reserved for the OFDM reference signals. If 48 of the 288 resource elements are used for OFDM reference signals, 240 resource elements remain for the PBCH. If each resource element has two bits, 480 bits are available for the transmission of the PBCH. A PBCH codeword is 120 bits, the 24 bit PBCH payload having been encoded by attaching a 16 bit CRC and performing TBCC. As 480 bits are available, the PBCH codeword may be transmitted multiple times. Therefore, in order to perform correlation, the 120 bit candidate codeword may be repeated four times in order to match the 480 bit received codeword.

Using the metric $Metric_i$, for each candidate payload, a sum is calculated for a comparison of each bit of the codeword for the candidate payload to the codeword for the received payload. For example, for a first candidate payload, i=0, the $Metric_0$ will equal the sum $$\sum_{n=1}^{N} c_n^{(0)} LLR_n = (c_1^0 * LLR_1) + (c_2^0 * LLR_2) + \ldots + (c_N^0 * LLR_N).$$

The variable n indicates the bit of the respective codewords, e.g., $c_1$ indicates the first bit of the candidate codeword, and $LLR_1$ indicates the first bit of the log-likelihood ratio of the received payload. Similarly, for the next candidate codeword, i=1, the $Metric_1$ will equal the sum $$\sum_{n=1}^{N} c_n^{(i)} LLR_n.$$

The correct candidate payload may be determined by selecting the candidate payload having the highest calculated metric.

Decoding by correlation allows the UE to decode the PBCH signal without performing Interference Cancellation (IC).

In a synchronized HetNet, the SFN, and possibly the bandwidth, is the same across different cells. Therefore, the bandwidth information and information necessary to calculate a SFN can be acquired from a strong neighbor cell in order to perform decoding by correlation in a weaker, serving cell. This depends on the correlation between the serving cell and the neighbor cell.

Figure 13:
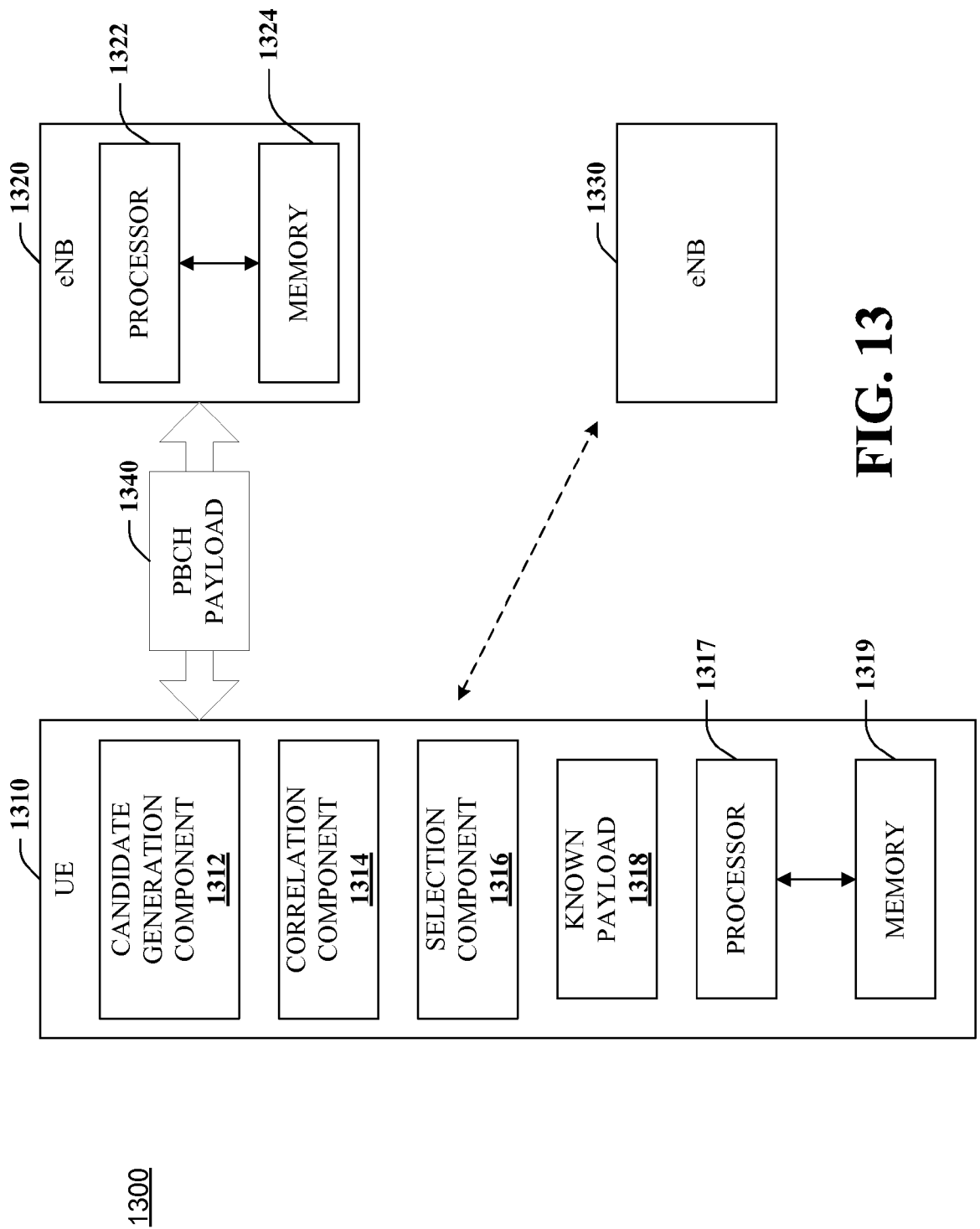
FIG. 13 is a diagram of example components of an exemplary apparatus.

Referring now to FIG. 13, a system 1300 is illustrated that facilitates decoding a received payload, e.g., a broadcast channel, the payload having a known portion and an unknown portion. As FIG. 13 illustrates, system 1300 can include one or more user equipment units (UE) 1310, which can communicate with one or more eNBs 1320 and/or 1330. While only one UE 1310 and two eNBs 1320 and 1330 are illustrated in FIG. 13, it will be appreciated that system 1300 can include any number of UEs 1310 and/or eNBs 1320, 1330. Further, it can be appreciated that respective eNBs in system 1300 can serve any suitable coverage area, such as an area associated with a macro cell, a femto cell, a pico cell (e.g., an access point base station or Home Node B (HNB)), and/or any other suitable type of coverage area. UE 1310 can provide similar functionality as apparatus 750 as described in regard to FIG. 7.

In an aspect, signals from eNB 1330 can generate high levels of interference. For instance, eNB 1330 can be associated with a femto cell, which is a typically low power access point base station in a communication network. eNB 1330 can include a closed subscriber group (CSG) such that a subscriber (e.g., UE 1310) that is not a member of the CSG is not permitted to connect through eNB 1330 to the communication network. The interference can inhibit the ability of UE 1310 to receive signals from eNB 1320. It should be appreciated that similar interference can be caused by eNB 1320 when UE 1310 is a member of the CSG of eNB 1330.

Interference from eNB 1330 can inhibit reliable decoding of a broadcast channel (e.g., a physical broadcast channel (PBCH) or a control channel) from eNB 1320. PBCH conveys time-critical information which facilitates decoding control and data channels. As noted above, for a PBCH, the system frame number increases by one for each 40 millisecond PBCH frame. In addition, bandwidth and reserved bits in the PBCH payload 1340 remain constant within a particular cell. Thus, information obtained from a known PBCH payload can be utilized to improve decoding PBCH in strong interference environments.

UE 1310 can utilize prior information to decode and evaluate the PBCH payload 1340 despite interference from eNB 1330. In one aspect, UE 1310 can utilize a candidate generation component 1312 that generates a plurality of payload hypothesis, e.g., possible candidate payloads corresponding to PBCH payload 1340, based on possible combinations of the unknown portion and using the known information. In one example, the known portions of the payload 1318 may be obtained from a previous PBCH payload that is successfully decoded. A previously decoded PBCH payload from eNB 1320, will provide bandwidth and reserved bits (e.g., the fields remain constant within a cell) and information needed to calculate the system frame number. The 3-bit PHICH configuration field remains unknown resulting in eight possible payloads values for PBCH 1340. Thus, the candidate generation component 1312 can generate eight possible candidate payloads corresponding to all possible values of the 3-bit PHICH configuration field.

In another example, the known portions of the payload may be obtained via a PBCH payload transmitted by a strong neighbor cell (e.g., eNB 1330). In some network configurations, fields from PBCH of a neighbor cell can correlate to fields of the PBCH payload 1340.

For each payload candidate, the candidate generation component can attach a 16-bit cyclic redundancy check (CRC) and perform TBCC to generate respective codewords. The codewords can be similar to codewords generated by eNB 1320 when processing and transmitting a PBCH payload to UE 1310. The codewords corresponding to candidate payloads can be evaluated by a correlation component 1314 that utilizes a reliability metric, such as the reliability metric $Metric_i$.

The UE 1310 can include a selection component 1316 that identifies a payload from the candidate payloads that corresponds to PBCH payload 1340. In one example, the selection component 1316 can select the candidate payload associated with a maximum metric determined by the correlation component 1314. The selected payload can be decoded to recover the PBCH payload 1340 (e.g., the master information block).

As further illustrated in system 1300, UE 1310 can include a processor 1317 and/or a memory 1319, which can be utilized to implement some or all of the functionality of the candidate generation component 1312, correlation component 1314, selection component 1316 and/or any other component(s) of UE 1310. Similarly, FIG. 13 illustrates that eNB 1320 can include a processor 1322 and/or memory 1324 to implement some or all of the functionality of eNB 1320.

Figure 14:
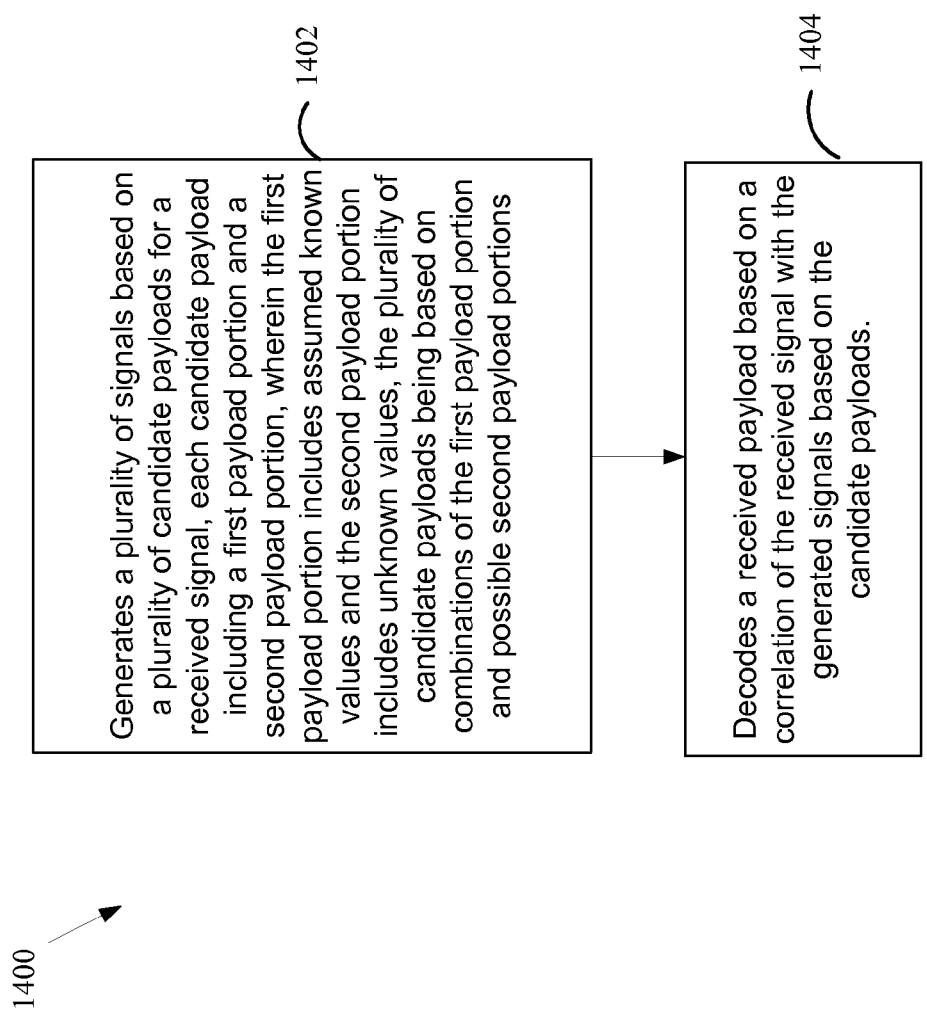
FIG. 14 is a flow chart of a method of wireless communication.

FIG. 14 is a flow chart 1400 of a method of wireless communication. The method generates a plurality of signals based on a plurality of candidate payloads for a received signal, each candidate payload including a first payload portion and a second payload portion, wherein the first payload portion includes assumed known values and the second payload portion includes unknown values, the plurality of candidate payloads being based on combinations of the first payload portion and possible second payload portions (1402). In addition, the method decodes a received signal based on a correlation of the received signal with the generated signals based on the candidate payloads (1404).

For example, the received payload that includes the known portion and the unknown portion may comprise a PBCH payload. The received payload may also comprise a control channel. If the received payload comprises a PBCH payload, the known portion may include at least one of system bandwidth information, a SFN, and information regarding the reserved bits. The unknown portion may comprise a PHICH configuration.

The method may further generate codewords for each of the plurality of candidate payloads, wherein the decoding comprises decoding the received payload based on the correlation of the received payload with the generated codewords. Each of the codewords may be generated by attaching a CRC to the corresponding candidate payload and performing TBCC on the corresponding candidate payload with the attached CRC.

The method may correlate the received payload with the candidate payloads to generate a plurality of metrics, where the decoding is based on the plurality of metrics. The method may further determine a candidate payload of the plurality of candidate payloads with a largest metric of the generated metrics, wherein the received payload is decoded based on the candidate payload with the largest metric. Each of the metrics may be a function of one candidate payload and a log likelihood ratio, the log likelihood ratio being a function of the one candidate payload and the received payload.

The metrics $metric_i$ may be generated by $$metric_i = \sum_{n=1}^{N} c_n^{(i)} LLR_n,$$

where i is an index of the candidate payload, $c_n^{(i)}$ is an $n^{th}$ bit of the $i^{th}$ candidate payload, $LLR_n$ is an $n^{th}$ bit of the log likelihood ratio for the received payload, and N is a payload length for both the candidate payload and the received payload.

The method may further receive a payload. The received payload may comprise a PBCH payload. The first payload portion may comprise at least one of system bandwidth information, a system frame number, and reserved bits. The second payload portion comprises a PHICH configuration.

Figure 15:
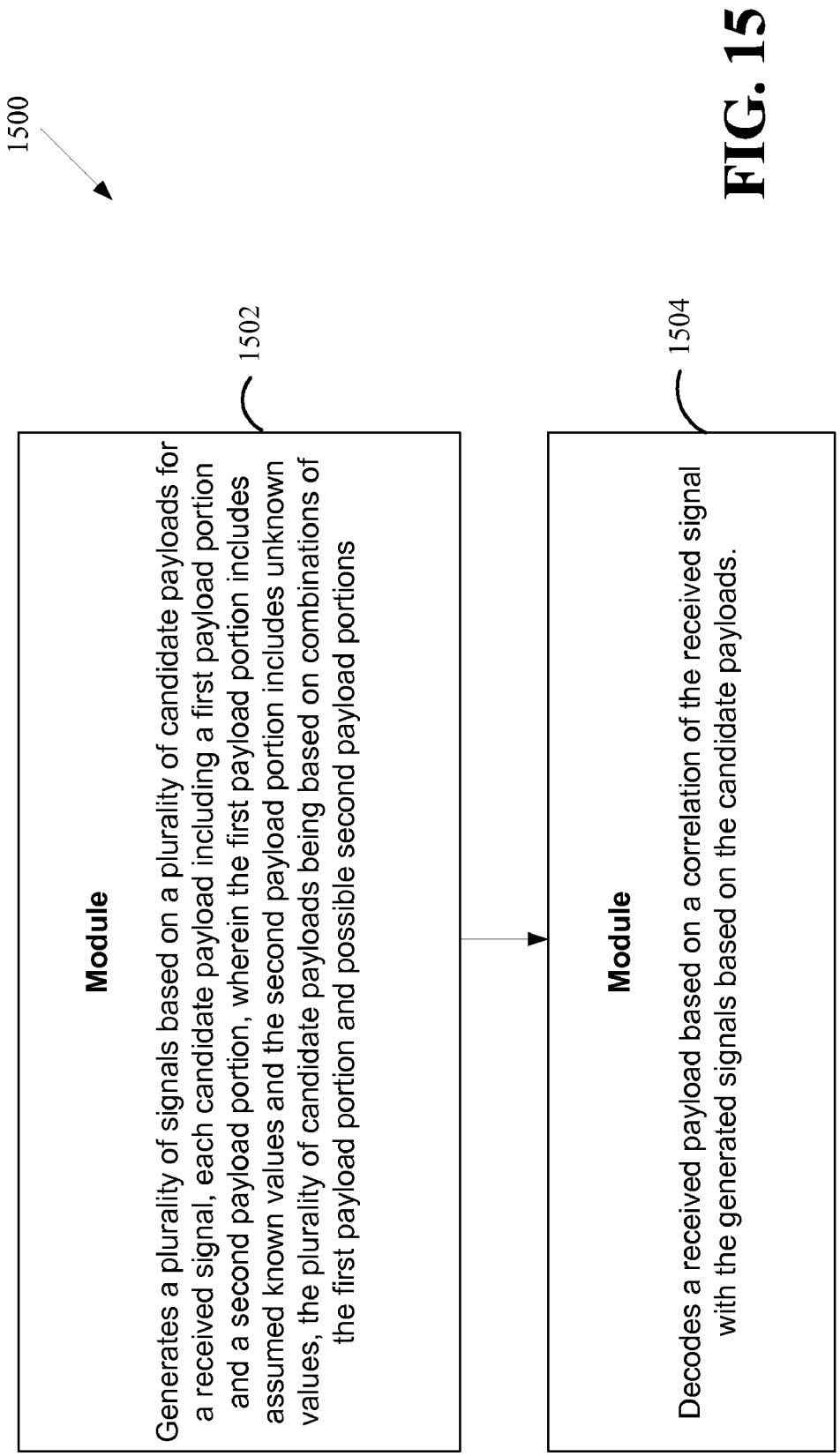
FIG. 15 is a conceptual block diagram illustrating the functionality of an exemplary apparatus.

FIG. 15 is a conceptual block diagram 1500 illustrating the functionality of an exemplary apparatus 100. The apparatus 100 includes a module 1502 that generates a plurality of signals based on a plurality of candidate payloads for a received signal, each candidate payload including a first payload portion and a second payload portion, wherein the first payload portion includes assumed known values and the second payload portion includes unknown values, the plurality of candidate payloads being based on combinations of the first payload portion and possible second payload portions, and a module 1504 that decodes a received signal based on a correlation of the received signal with the generated signals based on the candidate payloads.

Referring to FIG. 1 and FIG. 7, in one configuration, the apparatus 100 for wireless communication includes means for generating a plurality of candidate payloads for a received payload, each candidate payload including a first payload portion and a second payload portion, wherein the first payload portion includes assumed known values and the second payload portion includes unknown values, the plurality of candidate payloads being based on combinations of the first payload portion and possible second payload portions; and means for decoding the received payload based on a correlation of the received payload with the candidate payloads.

The aforementioned means is the processing system 114 configured to perform the functions recited by the aforementioned means. As described supra, the processing system 114 includes the TX Processor 768, the RX Processor 756, and the controller/processor 759. As such, in one configuration, the aforementioned means may be the TX Processor 768, the RX Processor 756, and the controller/processor 759 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   receiving a signal;
   generating a plurality of candidate signals based on a plurality of candidate payloads for the received signal, each candidate payload including a first payload portion and a second payload portion, wherein the first payload portion includes known values and the second payload portion includes potential values for unknown values for the received signal, the plurality of candidate payloads being based on combinations of the first payload portion and second payload portions; and
   decoding the received signal based on a correlation of the received signal with the plurality of generated candidate signals based on the candidate payloads,
   wherein the known values are assumed to correspond to values from a previously decoded payload, the values from the previously decoded payload including one or more of a system bandwidth information, a system frame number, reserve bits, or a combination thereof.

2. The method of claim 1, further comprising generating codewords for each of the generated signals based on the plurality of candidate payloads, and
   wherein the decoding comprises decoding the received signal based on the correlation of the received signal with the generated codewords.

3. The method of claim 2, wherein each of the codewords is generated by attaching a cyclic redundancy check (CRC) to the corresponding candidate payload and tail-biting convolutional coding the corresponding candidate payload with the attached CRC.

4. The method of claim 1, further comprising correlating the received signal with the candidate payloads to generate a plurality of metrics, wherein the decoding is based on the plurality of metrics.

5. The method of claim 4, further comprising determining a generated signal based on a candidate payload of the plurality of candidate payloads with a largest metric of the generated metrics, and
   wherein the received signal is decoded based on the generated signal based on the candidate payload with the largest metric.

6. The method of claim 5, wherein each of the metrics is a function of one generated signal based on one candidate payload and a log likelihood ratio, the log likelihood ratio being a function of the received signal.

7. The method of claim 1, wherein the received signal comprises a physical broadcast channel (PBCH) payload.

8. The method of claim 1, wherein the second payload portion comprises a physical hybrid automatic repeat request indicator channel (PHICH) configuration.

9. A method of wireless communication, comprising:
   generating a plurality of signals based on a plurality of candidate payloads for a received signal, each candidate payload including a first payload portion and a second payload portion, wherein the first payload portion includes known values and the second payload portion includes potential values for unknown values for the received signal, the plurality of candidate payloads being based on combinations of the first payload portion and second payload portions, wherein the known values are assumed to correspond to values from a previously decoded payload;
   decoding the received signal based on a correlation of the received signal with the generated signals based on the candidate payloads;
   correlating the received signal with the candidate payloads to generate a plurality of metrics, wherein the decoding is based on the plurality of metrics; and
   determining a generated signal based on a candidate payload of the plurality of candidate payloads with a largest metric of the generated metrics, wherein the received signal is decoded based on the generated signal based on the candidate payload with the largest metric,
   wherein each of the metrics is a function of one generated signal based on one candidate payload and a log likelihood ratio, the log likelihood ratio being a function of the received signal, and
   wherein the metrics $metric_i$ are generated by $$metric_i = \sum_{n=1}^{N} c_n^{(i)} LLR_n,$$

where i is an index of the candidate payload, $c_n^{(i)}$ is an $n^{th}$ bit of the $i^{th}$ candidate payload, $LLR_n$ is an $n^{th}$ bit of the log likelihood ratio for the received signal, and N is a payload length for both the generated signal based on the candidate payload and the received signal.

10. An apparatus for wireless communication, comprising:
    means for receiving a signal;
    means for generating a plurality of candidate signals based on a plurality of candidate payloads for the received signal, each candidate payload including a first payload portion and a second payload portion, wherein the first payload portion includes known values and the second payload portion includes potential values for unknown values for the received signal, the plurality of candidate payloads being based on combinations of the first payload portion and second payload portions; and
    means for decoding the received signal based on a correlation of the received signal with the plurality of generated candidate signals based on the candidate payloads,
    wherein the known values are assumed to correspond to values from a previously decoded payload, the values from the previously decoded payload including one or more of a system bandwidth information, a system frame number, reserve bits, or a combination thereof.

11. The apparatus of claim 10, further comprising:
    means for generating codewords for each of the generated signals based on the plurality of candidate payloads, and
    wherein the means for decoding the receive signal decodes the received signal based on the correlation of the received signal with the generated codewords.

12. The apparatus of claim 11, wherein each of the codewords is generated by attaching a cyclic redundancy check (CRC) to the corresponding candidate payload and tail-biting convolutional coding the corresponding candidate payload with the attached CRC.

13. The apparatus of claim 1, further comprising:
means for correlating the received signal with the candidate payloads to generate a plurality of metrics, wherein the means for decoding the received signal decodes the received signal based on the plurality of metrics.

14. The apparatus of claim 13, further comprising:
means for determining a generated signal based on a candidate payload of the plurality of candidate payloads with a largest metric of the generated metrics, and
wherein the means for decoding the received signal decodes the received signal based on the generated signal based on the candidate payload with the largest metric.

15. The apparatus of claim 14, wherein each of the metrics is a function of one generated signal based on one candidate payload and a log likelihood ratio, the log likelihood ratio being a function of the received signal.

16. The apparatus of claim 10, wherein the received signal comprises a physical broadcast channel (PBCH) payload.

17. The apparatus of claim 10, wherein the second payload portion comprises a physical hybrid automatic repeat request indicator channel (PHICH) configuration.

18. An apparatus for wireless communication, comprising:
means for generating a plurality of signals based on a plurality of candidate payloads for a received signal, each candidate payload including a first payload portion and a second payload portion, wherein the first payload portion includes known values and the second payload portion includes potential values for unknown values for the received signal, the plurality of candidate payloads being based on combinations of the first payload portion and second payload portions, wherein the known values are assumed to correspond to values from a previously decoded payload; and
means for decoding the received signal based on a correlation of the received signal with the generated signals based on the candidate payloads, wherein the means for decoding correlates the received signal with the candidate payloads to generate a plurality of metrics, wherein the decoding is based on the plurality of metrics, and determines a generated signal based on a candidate payload of the plurality of candidate payloads with a largest metric of the generated metrics, wherein the received signal is decoded based on the generated signal based on the candidate payload with the largest metric,
wherein each of the metrics is a function of one generated signal based on one candidate payload and a log likelihood ratio, the log likelihood ratio being a function of the received signal, and
wherein the metrics $metric_i$ are generated by $$metric_i = \sum_{n=1}^{N} c_n^{(i)} LLR_n,$$

where i is an index of the candidate payload, $c_n^{(i)}$ is is an $n^{th}$ bit of the $i^{th}$ candidate payload, $LLR_n$ is an $n^{th}$ bit of the log likelihood ratio for the received signal, and N is a payload length for both the generated signal based on the candidate payload and the received signal.

19. A computer program product, comprising:
a non-transitory computer-readable medium comprising code for:
receiving a signal;
generating a plurality of candidate signals based on a plurality of candidate payloads for the received signal, each candidate payload including a first payload portion and a second payload portion, wherein the first payload portion includes known values and the second payload portion includes potential values for unknown values for the received signal, the plurality of candidate payloads being based on combinations of the first payload portion and second payload portions; and
decoding the received signal based on a correlation of the received signal with the plurality of generated candidate signals based on the candidate payloads,
wherein the known values are assumed to correspond to values from a previously decoded payload, the values from the previously decoded payload including one or more of a system bandwidth information, a system frame number, reserve bits, or a combination thereof.

20. The computer program product of claim 19, further comprising code for generating codewords for each of the generated signals based on the plurality of candidate payloads, and
wherein the code for decoding the received signal decodes the received signal based on the correlation of the received signal with the generated codewords.

21. The computer program product of claim 20, wherein each of the codewords is generated by attaching a cyclic redundancy check (CRC) to the corresponding candidate payload and tail-biting convolutional coding the corresponding candidate payload with the attached CRC.

22. The computer program product of claim 19, further comprising code for correlating the received signal with the candidate payloads to generate a plurality of metrics, wherein the code for decoding the received signal decodes the received signal based on the plurality of metrics.

23. The computer program product of claim 22, further comprising code for determining a generated signal based on a candidate payload of the plurality of candidate payloads with a largest metric of the generated metrics, and
wherein the code for decoding the received signal decodes the received signal based on the generated signal based on the candidate payload with the largest metric.

24. The computer program product of claim 23, wherein each of the metrics is a function of one generated signal based on one candidate payload and a log likelihood ratio, the log likelihood ratio being a function of the received signal.

25. The computer program product of claim 19, wherein the received signal comprises a physical broadcast channel (PBCH) payload.

26. The computer program product of claim 19, wherein the second payload portion comprises a physical hybrid automatic repeat request indicator channel (PHICH) configuration.

27. A computer program product, comprising:
a non-transitory computer-readable medium comprising code for:
generating a plurality of signals based on a plurality of candidate payloads for a received signal, each candidate payload including a first payload portion and a second payload portion, wherein the first payload portion includes known values and the second payload portion includes potential values for unknown values for the received signal, the plurality of candidate payloads being based on combinations of the first payload portion and second payload portions, wherein the known values are assumed to correspond to values from a previously decoded payload;

decoding the received signal based on a correlation of the received signal with the generated signals based on the candidate payloads;

correlating the received signal with the candidate payloads to generate a plurality of metrics, wherein the decoding is based on the plurality of metrics; and determining a generated signal based on a candidate payload of the plurality of candidate payloads with a largest metric of the generated metrics, wherein the received signal is decoded based on the generated signal based on the candidate payload with the largest metric, wherein each of the metrics is a function of one generated signal based on one candidate payload and a log likelihood ratio, the log likelihood ratio being a function of the received signal, and wherein the metrics metric$_i$ are generated by $$metric_i = \sum_{n=1}^{N} c_n^{(i)} LLR_n,$$

where i is an index of the candidate payload, $c_n^{(i)}$ is an $n^{th}$ bit of the $i^{th}$ candidate payload, $LLR_n$ is an $n^{th}$ bit of the log likelihood ratio for the received signal, and N is a payload length for both the generated signal based on the candidate payload and the received signal.

28. An apparatus for wireless communication, comprising:
a processing system configured to:
receive a signal;
generate a plurality of candidate signals based on a plurality of candidate payloads for the received signal, each candidate payload including a first payload portion and a second payload portion, wherein the first payload portion includes known values and the second payload portion includes potential values for unknown values for the received signal, the plurality of candidate payloads being based on combinations of the first payload portion and second payload portions; and decode the received signal based on a correlation of the received signal with the plurality of generated candidate signals based on the candidate payloads, wherein the known values are assumed to correspond to values from a previously decoded payload, the values from the previously decoded payload including one or more of a system bandwidth information, a system frame number, reserve bits, or a combination thereof.

29. The apparatus of claim 28, wherein the processing system is further configured to generate codewords for each of the generated signals based on the plurality of candidate payloads, and wherein the processing system decodes the received signal based on the correlation of the received signal with the generated codewords.

30. The apparatus of claim 29, wherein each of the codewords is generated by attaching a cyclic redundancy check (CRC) to the corresponding candidate payload and tail-biting convolutional coding the corresponding candidate payload with the attached CRC.

31. The apparatus of claim 28, wherein the processing system is further configured to correlate the received signal with the candidate payloads to generate a plurality of metrics, wherein the processing system decodes the received signal based on the plurality of metrics.

32. The apparatus of claim 31, wherein the processing system is further configured to determine a generated signal based on a candidate payload of the plurality of candidate payloads with a largest metric of the generated metrics, and wherein the processing system decodes the received signal based on the generated signal based on the candidate payload with the largest metric.

33. The apparatus of claim 32, wherein each of the metrics is a function of one generated signal based on one candidate payload and a log likelihood ratio, the log likelihood ratio being a function of the received signal.

34. The apparatus of claim 28, wherein the received signal comprises a physical broadcast channel (PBCH) payload.

35. The apparatus of claim 28, wherein the second payload portion comprises a physical hybrid automatic repeat request indicator channel (PHICH) configuration.

36. An apparatus for wireless communication, comprising:
a processing system configured to:
generate a plurality of signals based on a plurality of candidate payloads for a received signal, each candidate payload including a first payload portion and a second payload portion, wherein the first payload portion includes known values and the second payload portion includes potential values for unknown values for the received signal, the plurality of candidate payloads being based on combinations of the first payload portion and second payload portions, wherein the known values are assumed to correspond to values from a previously decoded payload;

decode the received signal based on a correlation of the received signal with the generated signals based on the candidate payloads;

correlate the received signal with the candidate payloads to generate a plurality of metrics, wherein the decoding is based on the plurality of metrics; and determine a generated signal based on a candidate payload of the plurality of candidate payloads with a largest metric of the generated metrics, wherein the received signal is decoded based on the generated signal based on the candidate payload with the largest metric, wherein each of the metrics is a function of one generated signal based on one candidate payload and a log likelihood ratio, the log likelihood ratio being a function of the received signal, and wherein the metrics metric$_i$ are generated by $$metric_i = \sum_{n=1}^{N} c_n^{(i)} LLR_n,$$

where i is an index of the candidate payload, $c_n^{(i)}$ is an $n^{th}$ bit of the $i^{th}$ candidate payload, $LLR_n$ is an $n^{th}$ bit of the log likelihood ratio for the received signal, and N is a payload length for both the generated signal based on the candidate payload and the received signal.

* * * * *